United States Patent [19]

Ohtake et al.

[11] Patent Number: 5,765,056
[45] Date of Patent: Jun. 9, 1998

[54] CAMERA HAVING PARALLAX COMPENSATION APPARATUS

[75] Inventors: Motoyuki Ohtake; Koichi Ohshita, both of Tokyo, Japan

[73] Assignee: Nikon Corporation, Tokyo, Japan

[21] Appl. No.: 733,600

[22] Filed: Oct. 18, 1996

[30] Foreign Application Priority Data

Oct. 27, 1995 [JP] Japan .................... 7-303933

[51] Int. Cl.$^6$ .................... G03B 13/14
[52] U.S. Cl. .................... 396/149; 396/377
[58] Field of Search .................... 396/72, 148, 149, 396/373, 377

[56] References Cited

U.S. PATENT DOCUMENTS

| | | | |
|---|---|---|---|
| 4,129,369 | 12/1978 | Kobayashi et al. | 396/377 |
| 4,924,247 | 5/1990 | Suzuki et al. | 396/348 |
| 5,142,312 | 8/1992 | Suzuki et al. | 396/357 |
| 5,173,726 | 12/1992 | Burnham et al. | 396/377 |
| 5,335,032 | 8/1994 | Onuki et al. | 396/53 |
| 5,461,442 | 10/1995 | Ohshita | 396/377 |
| 5,594,518 | 1/1997 | Ohshita | 396/133 |
| 5,604,563 | 2/1997 | Nonaka | 396/149 |

FOREIGN PATENT DOCUMENTS 6-95217  4/1994  Japan .

*Primary Examiner*—Safet Metjahic
*Assistant Examiner*—Eddie C. Lee
*Attorney, Agent, or Firm*—Oliff & Berridge, P.L.C.

[57] ABSTRACT

A camera having an apparatus for correcting parallax includes viewfinder optical system for viewing an object. A shooting lens system for photographing the object is disposed such that the optical axis of the shooting lens system is different from the optical axis of the viewfinder optical system. The shooting lens system includes a correcting lens group such that image shift is accomplished by decentering the correcting lens group. A focusing lens group, spaced from the correcting lens group, is moveable along the optical axis of the shooting lens system. Parallax that is created by changes in the position of the object is corrected by accomplishing an image shift by the shooting lens system.

12 Claims, 12 Drawing Sheets

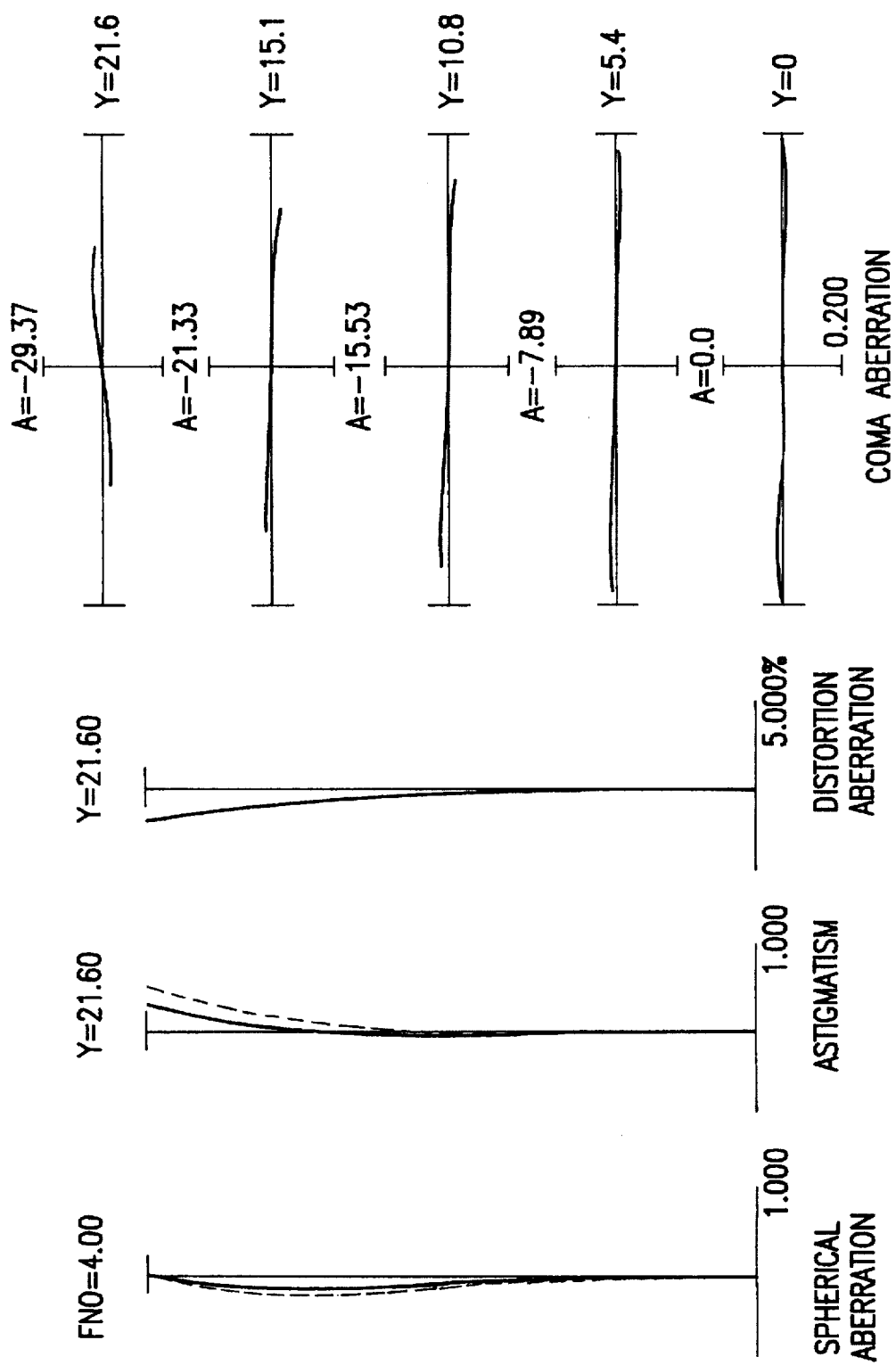

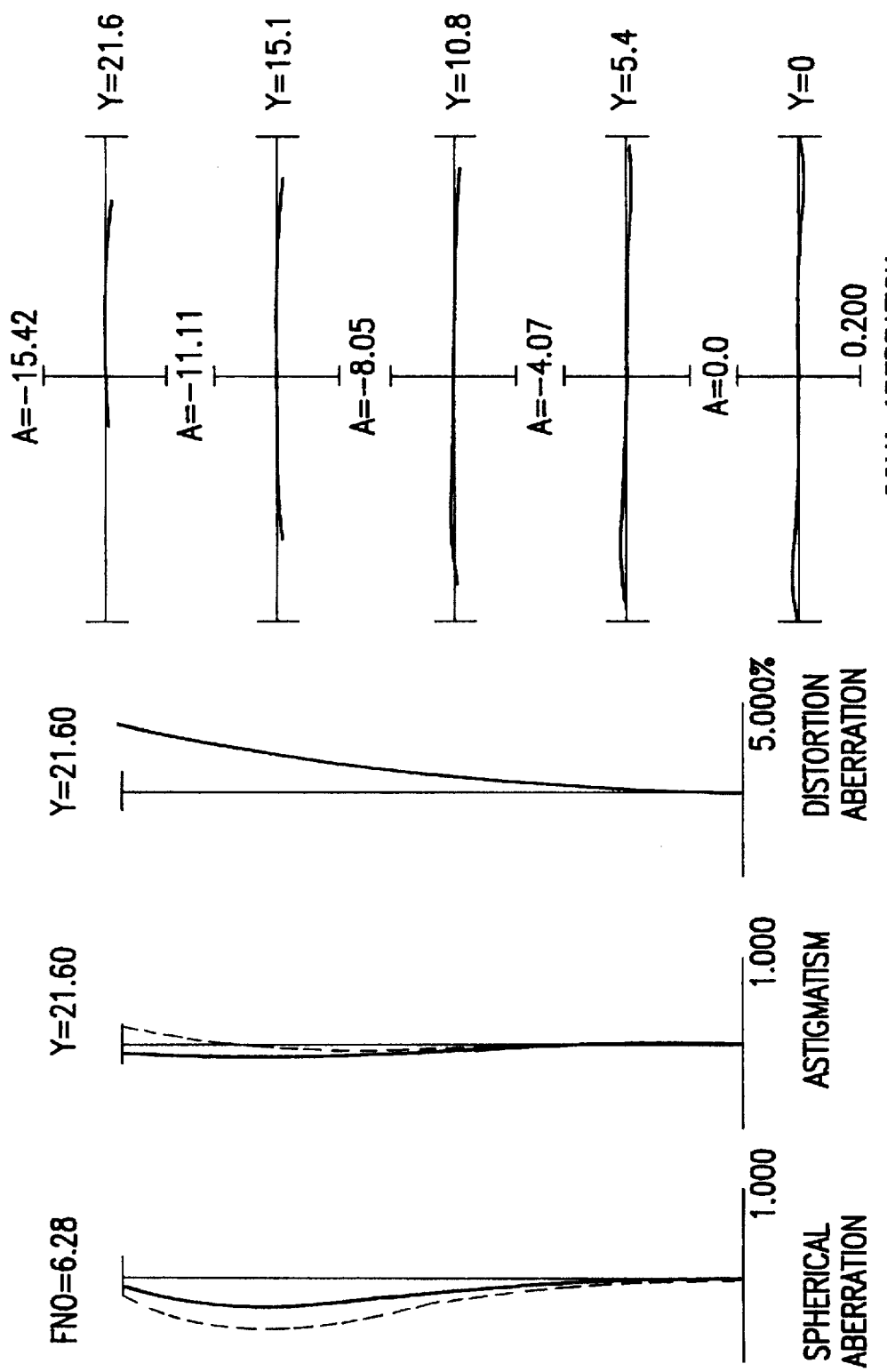

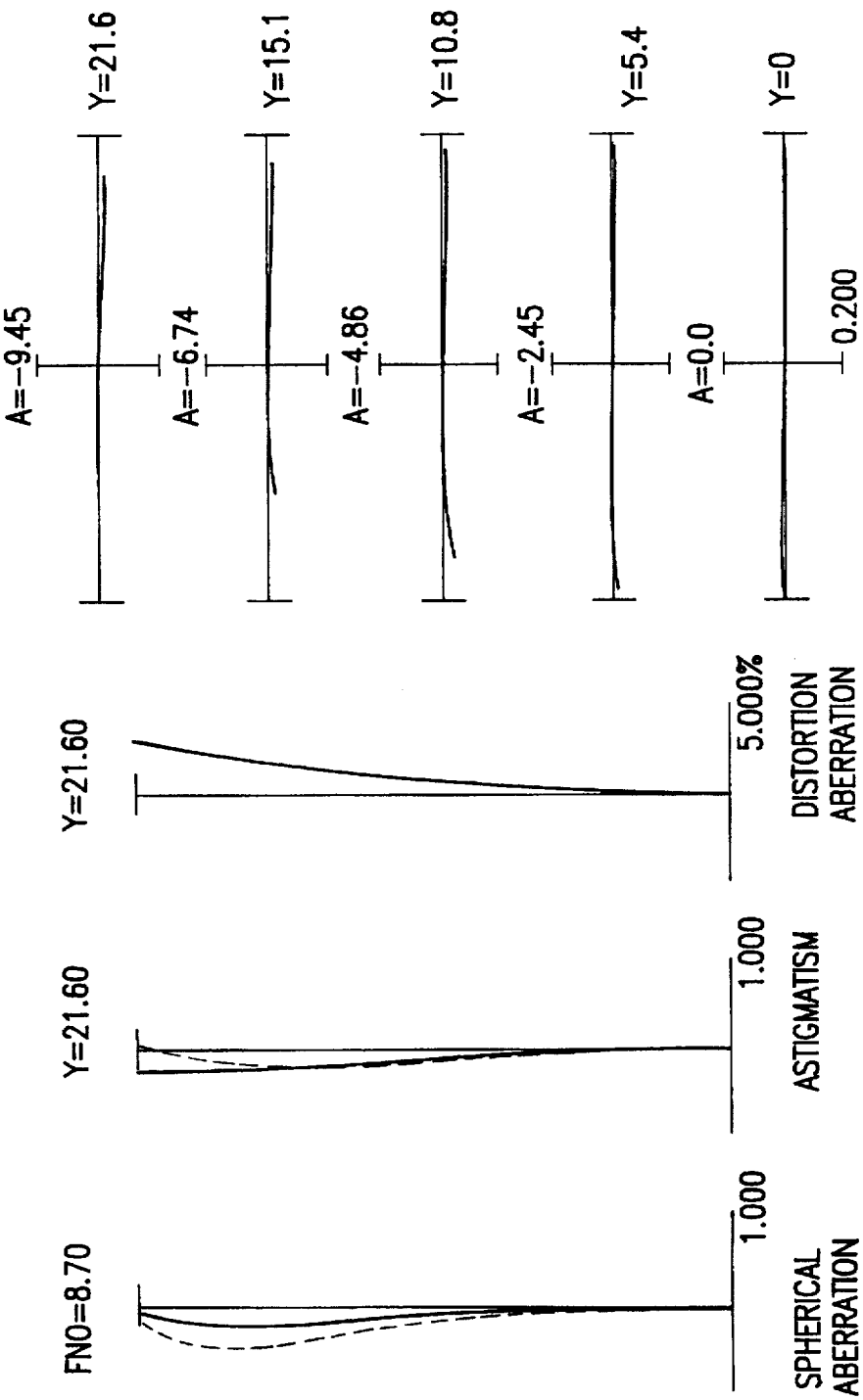

CAMERA HAVING PARALLAX COMPENSATION APPARATUS

BACKGROUND OF THE INVENTION

1. Field of the Invention

The present invention relates to a camera, and more particularly, to the correction of parallax in a camera in which the optical axis of the shooting lens system is different from the optical axis of the viewfinder system.

2. Description of Related Art

In a single lens reflex (SLR) camera in which the optical axis of the shooting lens system is the same as the optical axis of the viewfinder system, parallax is not created between the shooting lens and viewfinder systems even if the position of the object changes. However, in a lens shutter (LS) camera or similar apparatus in which the optical axis of the shooting lens system is different from the optical axis of the viewfinder system, parallax is created between the shooting lens and viewfinder systems.

When parallax exists, the phototaking range of the shooting lens system changes with respect to the field of view range of the viewfinder system, depending on the position of the object. Thus, when parallax exists, the photographic range which the photographer thinks was photographed is different from the range which was actually photographed, particularly for close objects.

A conventional method of correcting parallax changes the range of the field of view frame of the viewfinder system in accordance with the object distance. The photographic range when photographing a distant object and the photographic range when photographing a close object are printed separately on the field of view frame. This constitutes an inexpensive method of correcting parallax.

Another conventional method of correcting parallax is disclosed in Japanese Laid-Open Patent Publication 6-95217. This method corrects parallax by displacing the entire shooting lens in a direction which deviates from the optical axis of the lens system when photographing close objects.

However, zoom lenses are now often used as shooting lenses. In particular, zoom lenses that are capable of high zooming ratios are now mainstream. Additionally, cameras capable of photographing closer objects have also increased in number.

As noted above, in a camera in which the optical axis of the shooting lens system is different from the optical axis of the viewfinder system, the range corresponding to the photographic range of the shooting lens system on the field of view frame of the viewfinder system changes with the position of the object. In particular, the phototaking magnification increases when photography is accomplished at closer distances and when photography is accomplished at longer focal lengths. Also, the range corresponding to the photographic range on the field of view frame of the viewfinder system is completely different for the infinite focus state as opposed to the closest focus state.

Correcting parallax by changing the range of a conventional viewfinder field of view frame in accordance with the object distance adds a portion of the range of the field of view frame with respect to close photography. Accordingly, the field of view ratio at close photography drops excessively when photography is accomplished at closer distances or when photography is accomplished at longer focal length states. The viewfinder system must be large to resolve the decrease in the field of view ratio. Thus, it is difficult to use this method with LS cameras which require the viewfinder system to be compact.

The method disclosed in Japanese Laid-Open Patent Publication 6-95217 is substantially effective at preventing parallax. However, during manufacturing, it is difficult to manage the deviation between the direction of the optical axis of the shooting lens and the direction in which the shooting lens system as a whole is displaced. Also, the lens barrel composition is substantially more complex than conventional cameras. Thus, realization of this method is difficult.

Another recently developed method of correcting parallax uses a liquid crystal display device to change the field of view frame on the basis of changes in the object distance and the focal length. However, with a camera which has a shooting lens, the zooming ratio of which exceeds 3, the amount of parallax created by the focal length varies widely, even with the same object distance. Consequently, costs are increased since an excessive number of field of view frames is required.

SUMMARY OF THE INVENTION

It is therefore an object of the present invention to provide a camera which corrects parallax by utilizing a simple structure.

The present invention solves the above described problems by providing a camera that includes a shooting lens system for photographing an object. A viewfinder optical system is used to observe the object, such that the optical axis of the shooting lens system is different from the optical axis of the viewfinder optical system. The shooting lens system includes a correcting lens group such that image shifting is accomplished by decentering the correcting lens group. A focussing lens group, which moves along the optical axis during focussing, is disposed away from the correcting lens group. Parallax created by changes in the object position is corrected by accomplishing an image shift by means of the shooting lens system.

In accordance with another aspect of the present invention, a camera is provided that includes a shooting lens system for photographing an object. A viewfinder optical system is used to observe the object, such that the optical axis of the shooting lens system is different from the optical axis of the viewfinder optical system. The shooting lens system includes a correcting lens group. Parallax created by changes in the object position is corrected by driving the correcting lens group in a direction substantially perpendicular to the optical axis.

The condition:

$$0.2 < (Bt/Bw)/Z < 1$$

is satisfied, wherein $\beta at$ is the lateral magnification at the maximum telephoto state of the correcting lens group, $\beta bt$ is the lateral magnification at the maximum telephoto state of the lens group which is positioned to the image side of the correcting lens group, $\beta aw$ is the lateral magnification at the maximum wide-angle state of the correcting lens group, $\beta bw$ is the lateral magnification at the maximum wide-angle state of the lens group positioned to the image side of the correcting lens group, fw is the focal length of the shooting lens system at the maximum wide-angle state, ft is the focal length of the shooting lens system at the maximum telephoto state, Bt is the quantity expressed by $(1-\beta at)\beta bt$, Bw is the quantity expressed by $(1-\beta aw)\beta bw$, and Z is the zooming ratio expressed by ft/fw.

Lens systems are known that are capable of image shifting. The image shifting is accomplished by causing a portion of the lens groups, i.e., the decentering lens group, out of the plurality of lens groups that comprise the lens system, to be decentered. The decentering can be accomplished by either a shift method or a tilt method.

A known tilt method uses a variable vertex angle prism. Another known method simultaneously creates a shift and a tilt, which is consistent with an agitation method that causes one lens plane to rotate with the center of curvature thereof as the center of rotation.

A known shift method shifts the image by causing the decentering lens group to move in a direction substantially perpendicular to the optical axis of the lens system.

Conventional lens systems capable of these image shifts prevent the optical systems from shaking. These systems correct image shaking, i.e., fluctuations in the image position caused by the camera shaking, by combining a detecting system that detects shaking of the lens system with a driving system that causes the decentering lens group to be decentered.

With a lens system capable of image shifting, the photographic range shifts with respect to the image plane when the decentering lens group is decentered. According to the present invention, parallax is corrected by causing the photographic range to be decentered through an image shift when photographing close objects. This technique corrects deviations between the field of view range of the viewfinder system and the photographic range of the shooting lens system.

In accordance with the present invention, parallax is corrected by decentering a portion of the lens groups, i.e., the correcting lens group, of the shooting lens system. Accordingly, good imaging performance must be maintained when the correcting lens group is decentered, e.g., during image shifting.

Thus, in the present invention, correcting a large quantity of parallax restricts the driving and control mechanisms, as well as the optical performance of the shooting lens system.

More particularly, in accordance with the present invention, the shift method is more effective in correcting larger amounts of parallax than the tilt method. The shift amount of the photographic range increases when the tilt method is used. The chromatic aberration also increases which makes it difficult to maintain good imaging performance during image shifting. Conversely, with the shift method, fluctuations in the chromatic aberration created during image shifting can be suppressed by suppressing the chromatic aberration created by the correcting lens group alone. This is accomplished by forming the correcting lens group from a plurality of lenses.

The following is a description of a method of correcting parallax by a specific shift method.

FIG. 1 is a schematic showing an offset of a photographic range that occurs when a correcting lens group, e.g., the shift lens group that is composed of a portion of the lens groups in the shooting lens system, is shifted in a direction perpendicular to an optical axis.

As shown in FIG. 1, the shooting lens system includes, in the following order from the object side: a lens group Gc, a shift lens group Ga, and a lens group Gb. As shown in FIG. 1, OBJ indicates an object, IMG indicates an image plane, and F indicates a viewfinder optical system.

Light rays r1 and r3 stipulate the photographic range of the shooting optical system prior to image shifting. Light ray r2 stipulates the center of photography. Light rays r4 and r6, indicated by dashed lines, stipulate the photographic range of the shooting lens system during image shifting, i.e., when the shift lens group Ga is driven to the position indicated by the dashed line in FIG. 1. Light ray r5 stipulates the center of photography. Light rays r7 and r9 determine the field of view range of the viewfinder system F. Light ray r8 stipulates the center of the field of view.

Thus, prior to image shifting, light rays r1 to r3, which stipulate the photographic range, do not coincide with light rays r7 to r9, which stipulate the field of view range on the object OBJ. However, during image shifting, light rays r4 to r6, which stipulate the photographic range, coincide with light rays r7 to r9, which stipulate the field of view range. This image shifting causes the field of view range and the photographic range, which deviate from each other prior to image shifting, to coincide. Parallax is corrected by this image shifting.

The image shift amount $\delta z$ with respect to the shift amount $\delta s$ of the shift lens group Ga is expressed by equation (a) below.

$$\delta z = (1 - \beta a) \beta b \cdot \delta s \quad (a)$$

$\beta a$ is the lateral magnification of the shift lens group Ga. $\beta b$ is the lateral magnification of the lens group Gb, which is positioned to the image side of the shift lens group Ga.

However, when the photographic magnification is $\beta$, the shift amount $\delta p$ of the photographic range can be expressed by equation (b) below.

$$\delta p = \delta z / \beta = (1 - \beta a) \beta b \cdot \delta s / \beta \quad (b)$$

The creation of parallax can be corrected by accomplishing an image shift which satisfies the relationship indicated by equation (c) below, wherein $\Delta$ is the deviation between the optical axis of the shooting lens and the optical axis of the viewfinder.

$$\Delta + \delta p = 0 \quad (c)$$

Equation (d) below is obtained as the condition equation for correcting the creation of parallax by substituting equation (b) into equation (c).

$$\Delta + (1 - \beta a) \beta b \cdot \delta s / \beta = 0 \quad (d)$$

In equation (d), the ratio between $(1 - \beta a) \beta b$ and the photographic magnification $\beta$ is determined beforehand on the basis of the object distance R and the focal length f of the shooting lens system, as indicated by equation (e) below.

$$g(f, R) = (1 - \beta a) \beta b / \beta \quad (e)$$

Accordingly, the relationship indicated by equation (f) below is obtained from equation (d) and equation (e).

$$\delta s = -\Delta / g(f, R) \quad (f)$$

In equation (f), $\Delta$ is a predetermined amount unique to the camera. Consequently, by making the substitution $-\Delta / g(f, R) = h(f, R)$, the shift amount, i.e., the correction amount $\delta s$, of the shift lens group necessary to correct the parallax created under the conditions of the focal length f and the object distance R is expressed by equation (g) below.

$$\delta s = h(f, R) \quad (g)$$

An approximate value of the photographic magnification $\beta$ at a predetermined focal length state is calculated by equation (h) below as a polynomial in the object distance R.

$$\beta = \Sigma \, a_i R^{-i} (i = 0, 1, 2, 3, \ldots) \quad (h)$$

Here, $a_i$ is a coefficient which depends on the focal length f.

Accordingly, by letting $a_i = \Sigma\, b_{ij} f^j$, equation (h) is transformed into equation (h1) below.

$$\beta = \Sigma\, b_{ij} f^j R^{-i} \quad (i=0, 1, 2, 3, \ldots\, ; j=0, 1, 2, 3, \ldots) \quad \text{(h1)}$$

In the polynomials described below, $i=0, 1, 2, 3, \ldots$; $j=0, 1, 2, 3, \ldots$.

Additionally, an approximate value of $(1-\beta a)\,\beta b$ can similarly be calculated using equation (h2) below.

$$(1-\beta a)\,\beta b = \Sigma\, c_{ij} f^j R^{-i} \quad \text{(h2)}$$

The values of $\beta a$ and $\beta b$ are fixed and do not depend on the object distance when the focussing lens group, that moves along the optical axis during focussing, is positioned to the object side of the shift lens group Ga. Accordingly, equation (h2) is transformed into equation (k) below.

$$(1-\beta a)\,\beta b = \Sigma\, c_j f^j \quad \text{(k)}$$

Referring to equations (h1) and (h2), an approximate value of $h(f, R)$ can be calculated using the polynomial (m) below.

$$h(f, R) = -\Delta / \{\Sigma\, b_{ij} f^j R^{-i} \cdot \Sigma\, c_{ij} f^j R^{-i}\} \quad \text{(m)}$$

Thus, it is possible to approximate $h(f, R)$ using the polynomial (n) below through a transformation of equation (m).

$$h(f, R) = \Sigma\, d_{ij} f^j R^{-i} \quad \text{(n)}$$

Photography is not significantly hindered, even when the field of view range of the viewfinder and the photographic range of the shooting lens do not perfectly coincide at a predetermined object distance. In accordance with the present invention, it is preferable to use an approximating equation within a range in which the control error can be minimized, because the computation equation for computing the correction amount can be simplified.

Additionally, as indicated in equation (k), the values of $\beta a$ and $\beta b$ do not depend on the object distance R when the focussing lens group is positioned to the object side of the shift lens group. This is preferable because the approximations in equation (n) are more accurate.

In accordance with the present invention, parallax is corrected by moving the shift lens group in a direction that is substantially perpendicular to the optical axis, and when condition equation (1) below is satisfied.

$$0.2 < (Bt/Bw)/Z < 1 \quad \text{(1)}$$

Here, $Bt = (1-\beta at)\,\beta bt$, $Bw = (1-\beta aw)\,\beta bw$, and $Z = ft/fw$ (zoom ratio).

$\beta at$ is the lateral magnification at the maximum telephoto state of the correcting lens group. $\beta bt$ is the lateral magnification at the maximum telephoto state of the lens group which is positioned to the image side of the correcting lens group. $\beta aw$ is the lateral magnification at the maximum wide-angle state of the correcting lens group. $\beta bw$ is the lateral magnification at the maximum wide-angle state of the lens group positioned to the image side of the correcting lens group. fw is the focal length of the shooting lens system at the maximum wide-angle state. ft is the focal length of the shooting lens system at the maximum telephoto state.

Condition equation (1) is a condition equation which stipulates the ratio between the shift amount of the shift lens group and the shift amount of the photographic range.

The lens system disclosed in Japanese Laid-Open Patent Publication 6-95217 includes two lens groups, i.e., a positive lens group and a negative lens group. Parallax is corrected by shifting the negative lens group, which is positioned to the image side, in a direction substantially perpendicular to the optical axis.

Equation (b) is expressed as equation (o) below.

$$\delta p = (1-\beta a)\cdot\delta s/\beta \quad \text{(o)}$$

Accordingly, the ratios Bw and Bt, between the shift amount of the photographic range and the shift amount of the shift lens group at the maximum wide-angle state and the maximum telephoto state, are expressed as equations (p) and (q) below, respectively.

$$Bw = (1-\beta aw)/\beta w \quad \text{(p)}$$

$$Bt = (1-\beta at)/\beta t \quad \text{(q)}$$

$\beta w$ is the photographic magnification at the maximum wide-angle state. $\beta t$ is the photographic magnification at the maximum telephoto state.

FIG. 2 is a graph showing the arrangement of refractive powers of the lens system disclosed in Japanese Laid-Open Patent Publication 6-95217.

When a focussing state is assumed for a predetermined object distance at the maximum wide-angle state and the maximum telephoto state, the photographic magnifications $\beta w$ and $\beta t$ at the maximum wide-angle state and the maximum telephoto state are expressed by equations (r) and (s) below, respectively.

$$\beta w = \beta 1w \cdot \beta 2w \quad \text{(r)}$$

$$\beta t = \beta 1t \cdot \beta 2t \quad \text{(s)}$$

$\beta 1w$ is the lateral magnification of the positive lens group for a predetermined object distance state at the maximum wide-angle state. $\beta 2w$ is the lateral magnification of the negative lens group for a predetermined object distance state at the maximum wide-angle state. $\beta 1t$ is the lateral magnification of the positive lens group for a predetermined object distance state at the maximum telephoto state. $\beta 2t$ is the lateral magnification of the negative lens group for a predetermined object distance state at the maximum telephoto state.

The lateral magnification of the first lens group does not change substantially from the maximum wide-angle state to the maximum telephoto state when the object distance is considerably larger than the displacement of the first lens group, i.e., positive lens group. Thus, the approximation $\beta 1w = \beta 1t$ can be made. Accordingly, the relationship indicated by equation (t) below is obtained from equations (r) and (s).

$$\beta t/\beta w = \beta 2t/\beta 2w \quad \text{(t)}$$

The focal lengths fw and ft of the entire lens system in an infinite focus state at the maximum wide-angle state and the maximum telephoto state are expressed by equations (u) and (w) below, respectively.

$$fw = fa \cdot \beta 2w' \quad \text{(u)}$$

$$ft = fa \cdot \beta 2t' \quad \text{(w)}$$

fa is the focal length of the positive lens group. $\beta 2w'$ is the lateral magnification of the negative lens group in an infinite focus state at the maximum wide-angle state. $\beta 2t'$ is the lateral magnification of the negative lens group in an infinite focus state at the maximum telephoto state.

However, the zoom ratio Z is expressed by equation (x) below.

$$Z = ft/fw = \beta 2t'/\beta 2w' \quad (x)$$

Because $\beta 2t'/\beta 2w' = \beta 2t/\beta 2w$, the zoom ratio Z is approximated by equation (y) below.

$$Z = \beta 2t/\beta 2w \quad (y)$$

The relationship shown in equation (z) below is obtained from the relationship in equations (p), (q), (t) and (y).

$$Bt/Bw = \{(1-\beta at)/(1-\beta aw)\} \cdot Z \quad (z)$$

Thus, condition equation (1) can be expressed as equation (A) below.

$$(Bt/Bw)/Z = (1-\beta at)/(1-\beta aw) \quad (A)$$

βaw and βat are larger than 1, wherein βat>βaw. Thus, the right hand side of this equation is larger than 1. Therefore, the relationship indicated by equation (B) below is established.

$$(Bt/Bw)/Z > 1 \quad (B)$$

When the upper limit in condition equation (1) is exceeded, the correction amount at the maximum telephoto state where a large amount of parallax is created is smaller than the correction amount at the maximum wide-angle state, even at the same object distance. As a result, the balance between the positional precision of the shift lens group, which is required at the maximum wide-angle state, and the positional precision of the shift lens group, which is required at the maximum telephoto state, is destroyed. Thus, high positional precision is necessary.

When the lower limit in condition equation (1) is breached, the correction amount becomes excessively large at the maximum telephoto state compared with the maximum wide-angle state at the same object distance state. Consequently, positional control of the shift lens group becomes difficult.

In accordance with the present invention, it is possible to compute the shift amount, i.e., the correction amount, of the shift lens group required to correct parallax by means of the above computation equations. The correction amount is calculated on the basis of the object position information, i.e., object distance information, output from the object position detecting system which detects the object position, and the focal length information output from the focal length detecting system which detects the focal length state of the shooting lens. Parallax is corrected by driving the shift lens group by a correction amount. A driving system drives the shift lens group in a direction substantially perpendicular to the optical axis.

Additionally, the present invention can be used with a camera that is provided with either a fixed focus lens or a zoom lens as the shooting lens. Focal length information is not needed when the shooting lens is a fixed focus lens. Additionally, the correction amount can be computed solely on the basis of the object position information.

Accordingly, the decentering amount is computed based upon the object position and focal length information by using the above calculations.

However, it is not always necessary to directly detect the focal length of the shooting lens system with a focal length detecting system. For example, an amount can be detected such that the focal length is derived unconditionally, such as the displacement from a standard position by zooming one lens group. Furthermore, the output value of the focal length detecting system may be the detected value itself. The output value may also be a value that is obtained through computations from the detected value.

It is desirable to use the AF system as the object position detecting system. The object position information which is output from the AF system is used to control the focussing lens group and to correct the parallax. The camera can thus be constructed as a simple apparatus.

In accordance with the present invention, the object position detecting system can be combined with the shake preventing optical system. The shift lens group can be controlled easily by expressing the shift amount of the shift lens group as the sum of the parallax correction amount and the shake correction amount.

Further objects, details and advantages of the invention will be apparent from the following detailed description, when read in conjunction with the drawings.

BRIEF DESCRIPTION OF THE DRAWINGS

FIG. 11A is a diagram showing spherical aberration for the infinite focus state at the maximum wide-angle state in the second embodiment of the present invention.

FIG. 11B is a diagram showing astigmatism for the infinite focus state at the maximum wide-angle state in the second embodiment of the present invention.

FIG. 11C is a diagram showing distortion aberration for the infinite focus state at the maximum wide-angle state in the second embodiment of the present invention.

FIG. 11D is a diagram showing coma aberration for the infinite focus state at the maximum wide-angle state in the second embodiment of the present invention.

FIG. 12A is a diagram showing spherical aberration for the infinite focus state at the medium focal length state in the second embodiment of the present invention.

FIG. 12B is a diagram showing astigmatism for the infinite focus state at the medium focal length state in the second embodiment of the present invention.

FIG. 12C is a diagram showing distortion aberration for the infinite focus state at the medium focal length state in the second embodiment of the present invention.

FIG. 12D is a diagram showing coma aberration for the infinite focus state at the medium focal length state in the second embodiment of the present invention.

FIG. 13A is a diagram showing spherical aberration for the infinite focus state at the maximum telephoto state in the second embodiment of the present invention.

FIG. 13B is a diagram showing astigmatism for the infinite focus state at the maximum telephoto state in the second embodiment of the present invention.

FIG. 13C is a diagram showing distortion aberration for the infinite focus state at the maximum telephoto state in the second embodiment of the present invention.

FIG. 13D is a diagram showing coma aberration for the infinite focus state at the maximum telephoto state in the second embodiment of the present invention.

DETAILED DESCRIPTION OF PREFERRED EMBODIMENTS

Figure 1:
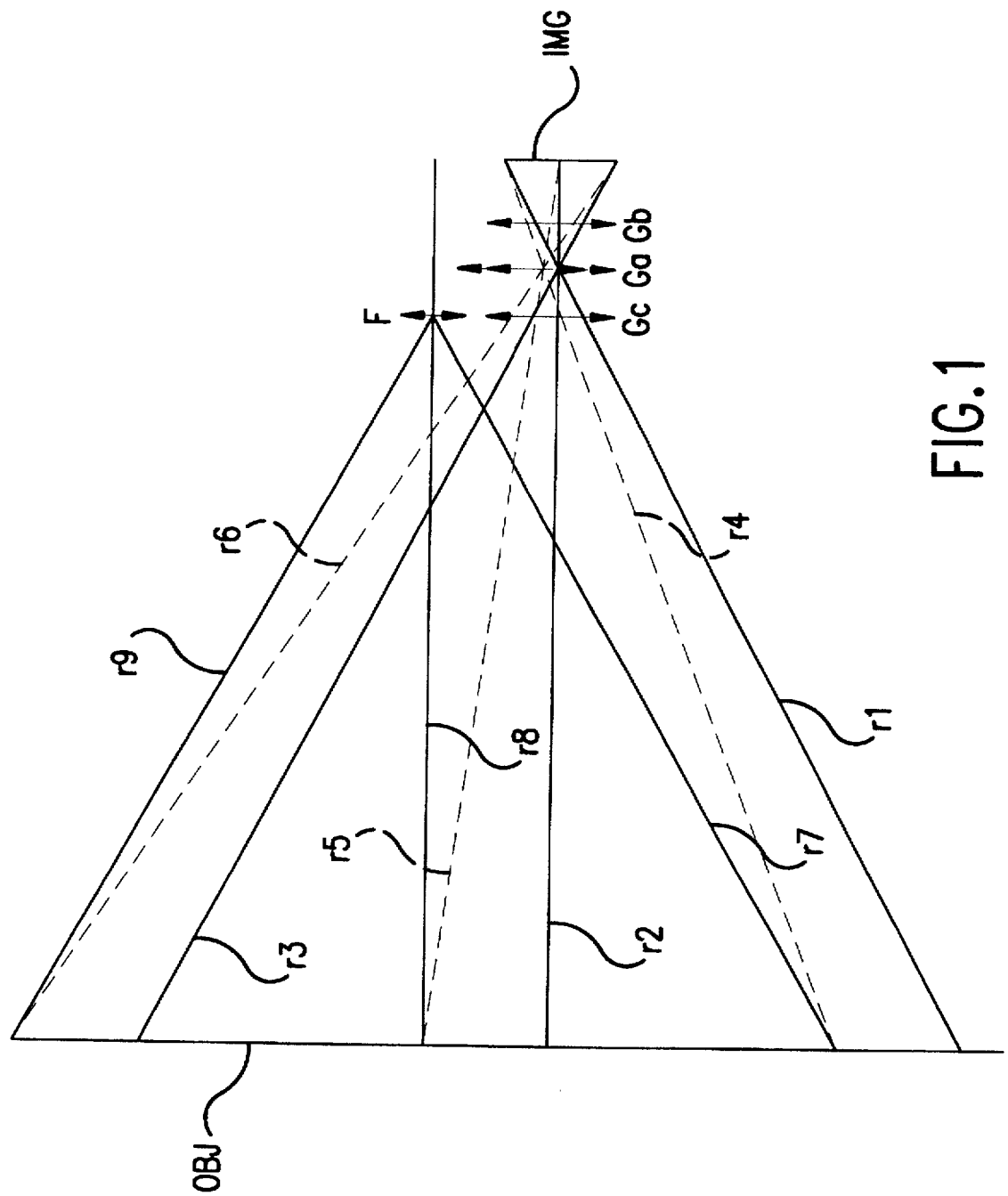
FIG. 1 is a schematic showing an offset of a photographic range that occurs when a correcting lens group, e.g., the shift lens group that is composed of a portion of the lens groups in the shooting lens system, is shifted in a direction perpendicular to an optical axis.
Figure 2:
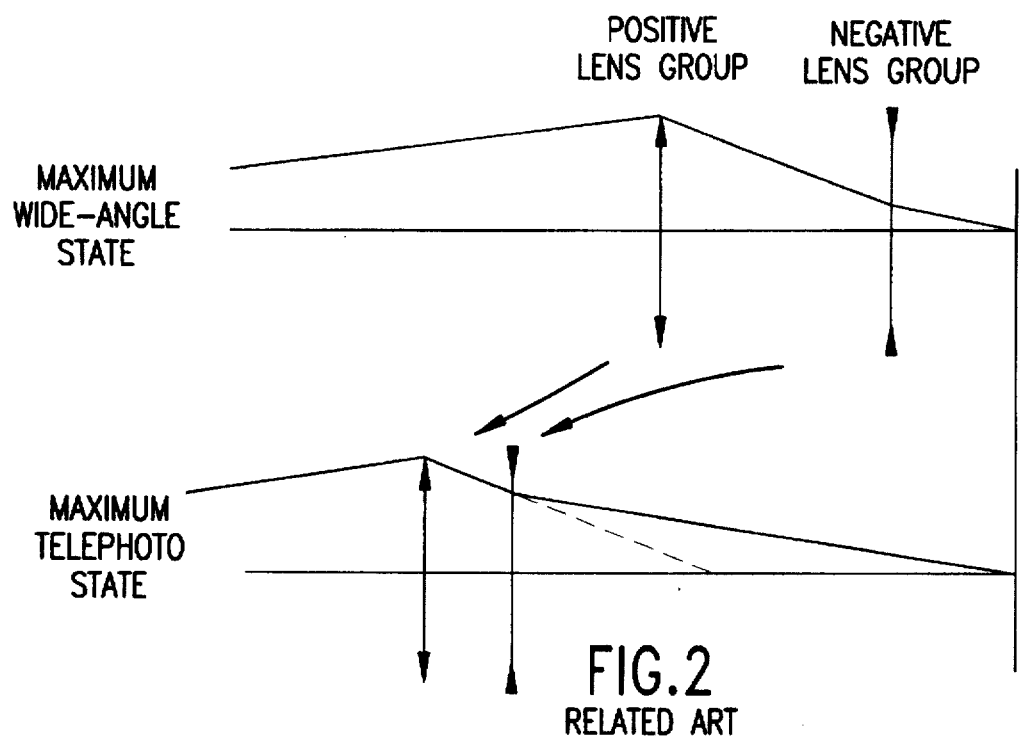
FIG. 2 is a graph showing the arrangement of refractive powers of the lens system disclosed in Japanese Laid-Open Patent Publication 6-95217.
Figure 3:
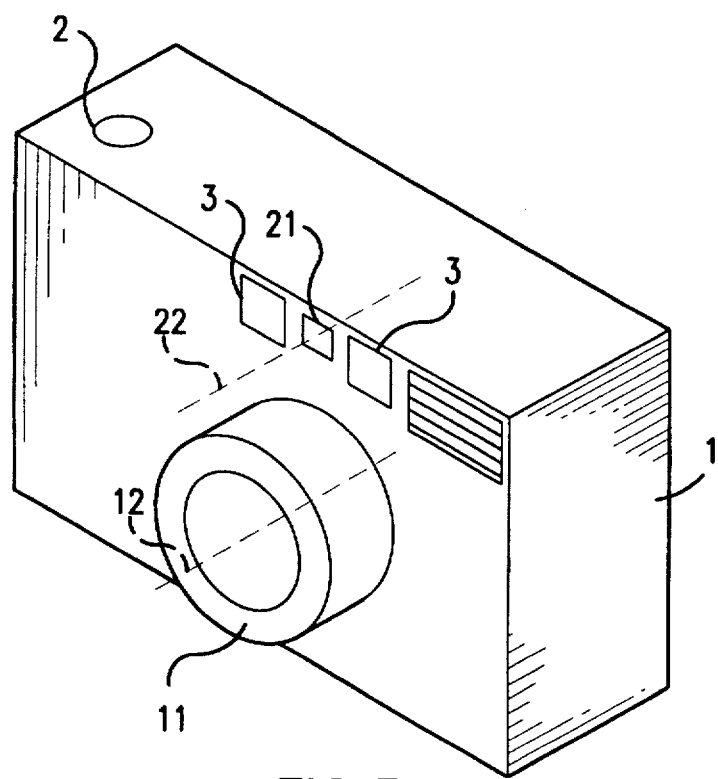
FIG. 3 is a perspective view showing the structure of a camera according to the present invention.

FIG. 3 is a perspective view showing the structure of a camera according to the present invention. In addition, FIG. 4 is a broken away elevational view showing the structure of the shooting lens system and the viewfinder system of the camera shown in FIG. 3.

The camera of FIG. 3 is provided with a camera body 1. A shooting lens system 11 having an optical axis 12, a viewfinder system 21 having an optical axis 22, and a range finding system (object position detecting system) 3, are disposed at a front side, i.e., object side, of the camera. A release button 2 is provided at a top surface of the camera body 1.

As shown in FIG. 3, the optical axis 12 of the shooting lens system 11 and the optical axis 22 of the viewfinder system 21 are parallel and separated vertically by a predetermined distance. Thus, when the camera is placed in the normal position, optical axes 12 and 22 have the same horizontal position but are separated vertically by a distance D.

Figure 4:
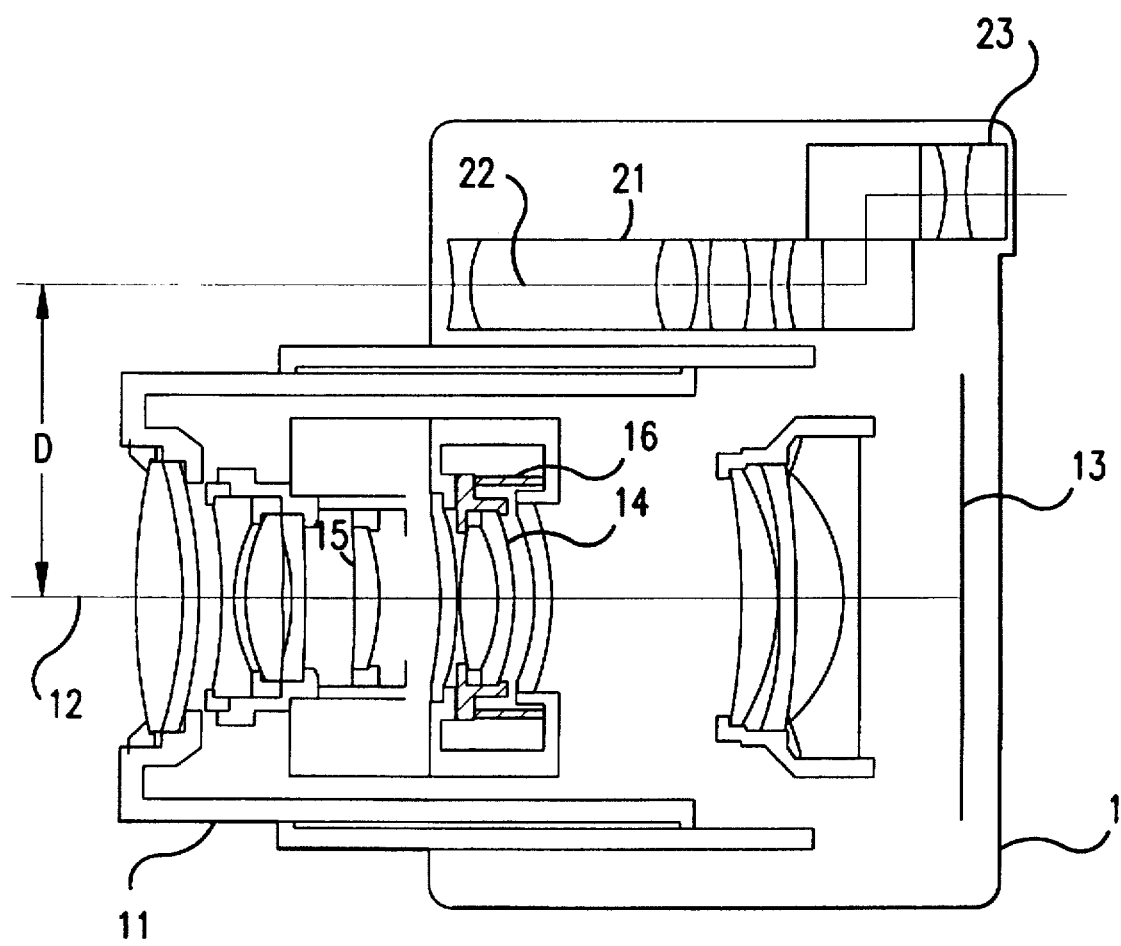
FIG. 4 is a broken away elevational view showing the structure of the shooting lens system and viewfinder system of the camera shown in FIG. 3.

As shown in FIG. 4, the shooting lens system 11 is provided with a correcting lens group 14. The correcting lens group 14 shifts in a direction substantially perpendicular to the optical axis 12 during parallax correction. A focussing lens group 15 moves along the optical axis 12 during focussing.

The focussing lens group 15 is disposed at the object side of the correcting lens group 14. The correcting lens group 14 is constructed to be driven to shift in a direction substantially perpendicular to the optical axis 12 by a driving system 16. A film plane 13 is perpendicular to the optical axis 12.

The viewfinder system 21 is provided with an objective lens system 23 and an eyepiece lens system 24.

Figure 5:
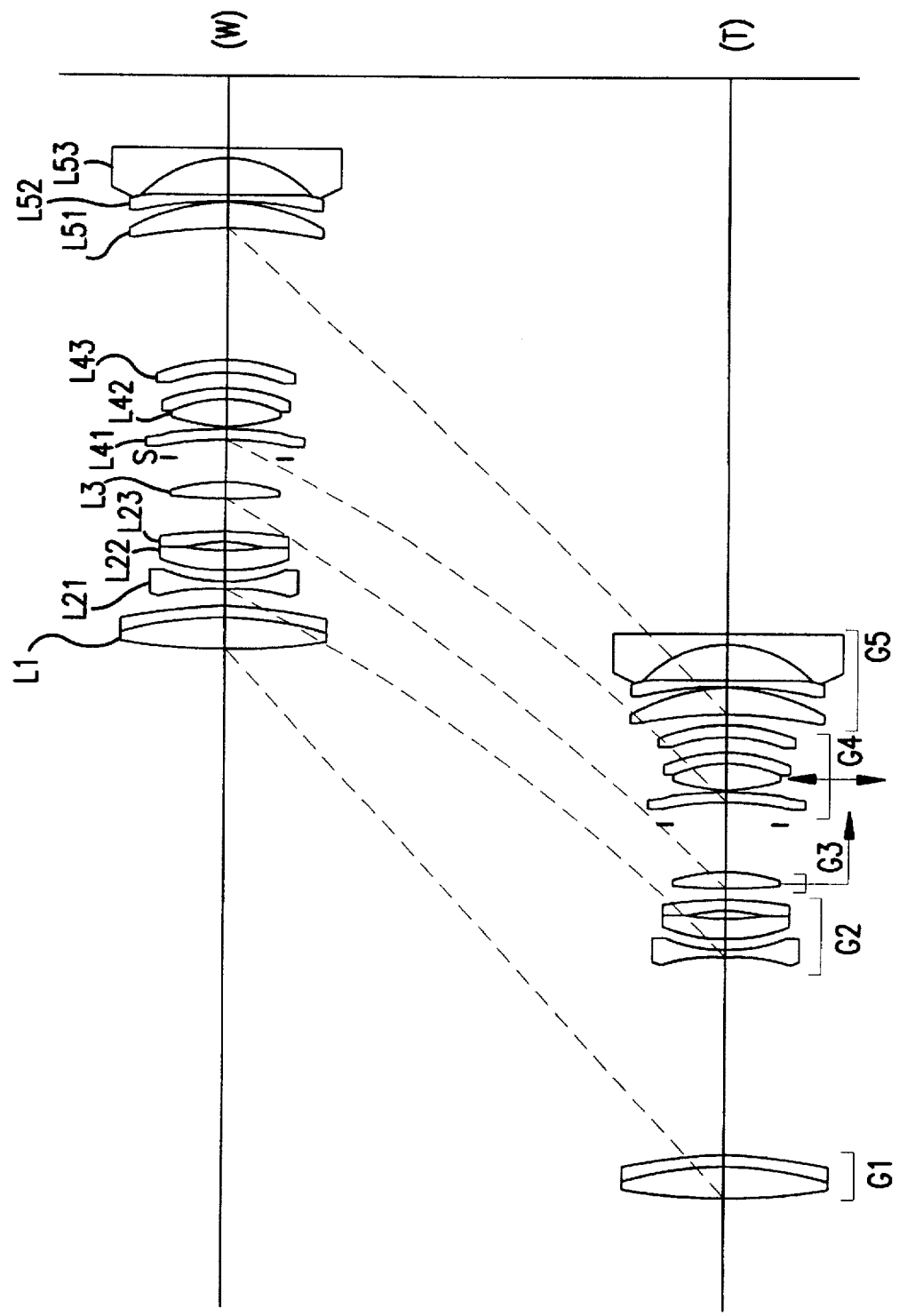
FIG. 5 is a schematic showing the lens composition of the shooting lens system according to the present invention.

FIG. 5 is a schematic showing the lens composition of a shooting lens system according to the present invention.

The shooting lens system of FIG. 5 includes, in the following order from the object side: a first lens group G1 of positive refractive power, a second lens group G2 of negative refractive power, a third lens group G3 of positive refractive power, a fourth lens group G4 of positive refractive power and a fifth lens group G5 of negative refractive power. During zooming from the maximum wide-angle state (W) to the maximum telephoto state (T), each of the lens groups moves toward the object side. Each of the lens groups moves along the loci indicated by the dashed lines shown in FIG. 5 so that the distance between the first lens group G1 and the second lens group G2 increases, the distance between the second lens group G2 and the third lens group G3 decreases, the distance between the third lens group G3 and the fourth lens group G4 increases and the distance between the fourth lens group G4 and the fifth lens group G5 decreases.

The first lens group G1 includes, in the following order from the object side: a positive cemented lens L1 that has a biconvex lens and a negative meniscus lens with the concave surface facing the object side.

The second lens group G2 includes, in the following order from the object side: a biconcave lens L21, a biconvex lens L22, and a negative meniscus lens L23 with the concave surface facing the object side.

The third lens group G3 includes a biconvex lens L3.

The fourth lens group G4 includes, in the following order from the object side: a negative meniscus lens L41 with the concave surface facing the object side, a positive cemented lens L42 that has a biconvex lens and a negative meniscus lens with the concave surface facing the object side, and a positive meniscus lens L43 with the concave surface facing the object side.

The fifth lens group G5 includes, in the following order from the object side: a positive meniscus lens L51 with the concave surface facing the object side, a negative meniscus lens L52 with the concave surface facing the object side, and a negative meniscus lens L53 with the concave surface facing the object side.

An aperture diaphragm S is disposed between the third lens group G3 and the fourth lens group G4. The aperture diaphragm 5 moves integrally with the fourth lens group G4 during zooming from the maximum wide-angle state to the maximum telephoto state.

The third lens group G3 operates as the focussing lens group 15. Thus, focussing is accomplished by moving the third lens group G3 along the optical axis.

The positive cemented lens L42 in the fourth lens group G4 operates as the correcting lens 14. Thus, parallax is corrected through image shifting by moving the positive cemented lens L42 in a direction substantially perpendicular to the optical axis. As noted above, the optical axis 12 of the shooting lens system 11 is spaced vertically from the optical axis 22 of the viewfinder system 21 by a distance D. Accordingly, parallax is corrected by moving the positive cemented lens L42 in a vertical direction substantially perpendicular to the optical axes.

The aspherical surfaces are expressed by the following equation (2), wherein y is the height in a direction perpendicular to the optical axis, S(y) is displacement, sag amount: positive being in the direction in which light rays travel in the direction of the optical axis at height y, R is a reference radius of curvature, κ is a conical coefficient, and Cn is the aspherical surface coefficient of nth degree.

$$S(y)=(y/R)/[1+(1-\kappa \cdot Y^2/R^2)^{1/2}]+C_4 \cdot Y^4+C_6 y^6+C_8 \cdot y^8+C_{10} \cdot y^{10}+\ldots \quad (2)$$

The aspherical surfaces are marked with a * to the right side of the surface number.

Figure 6:
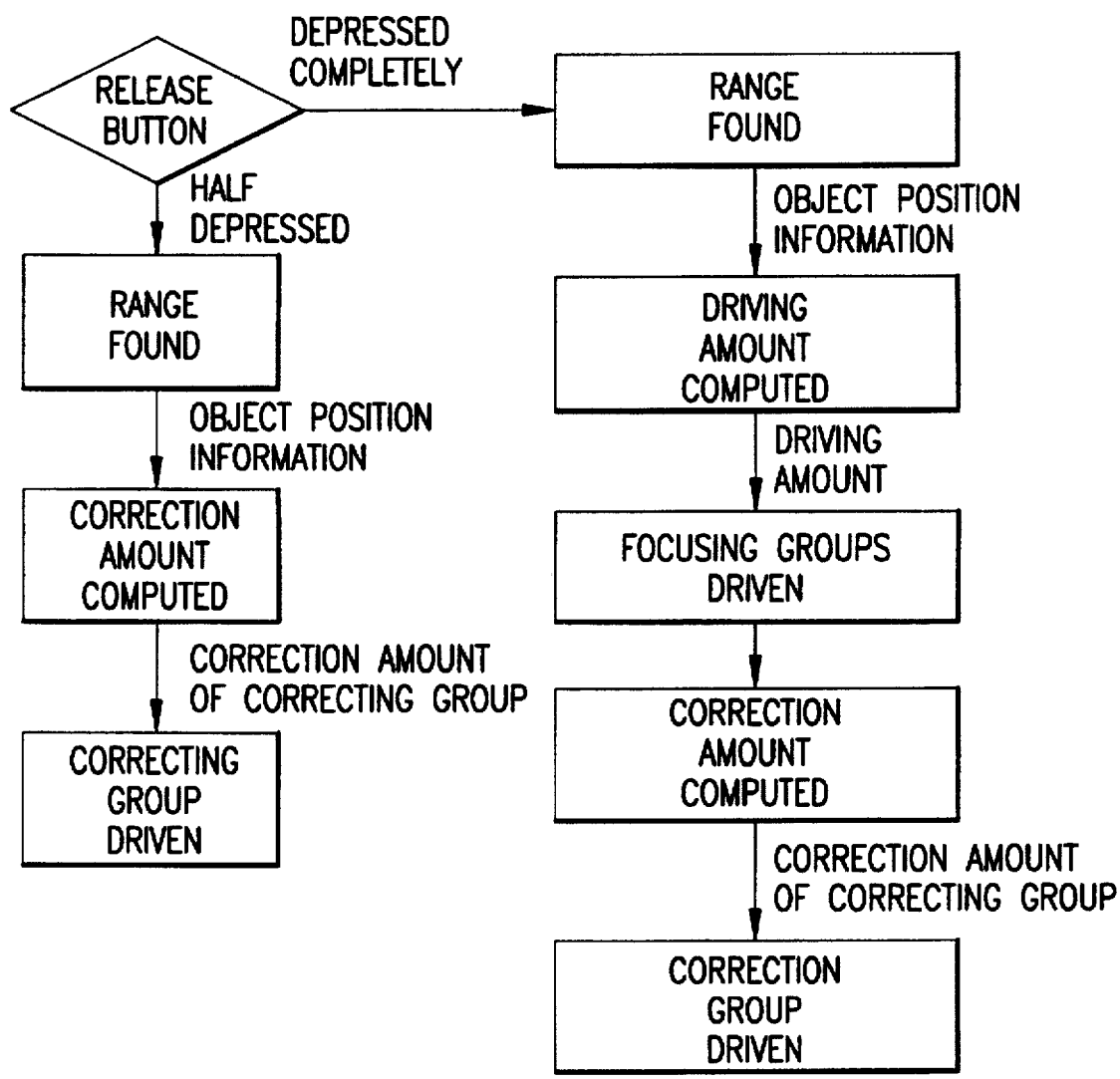
FIG. 6 is a flow chart showing the order of operations in a first embodiment of the present invention.
Figure 7:
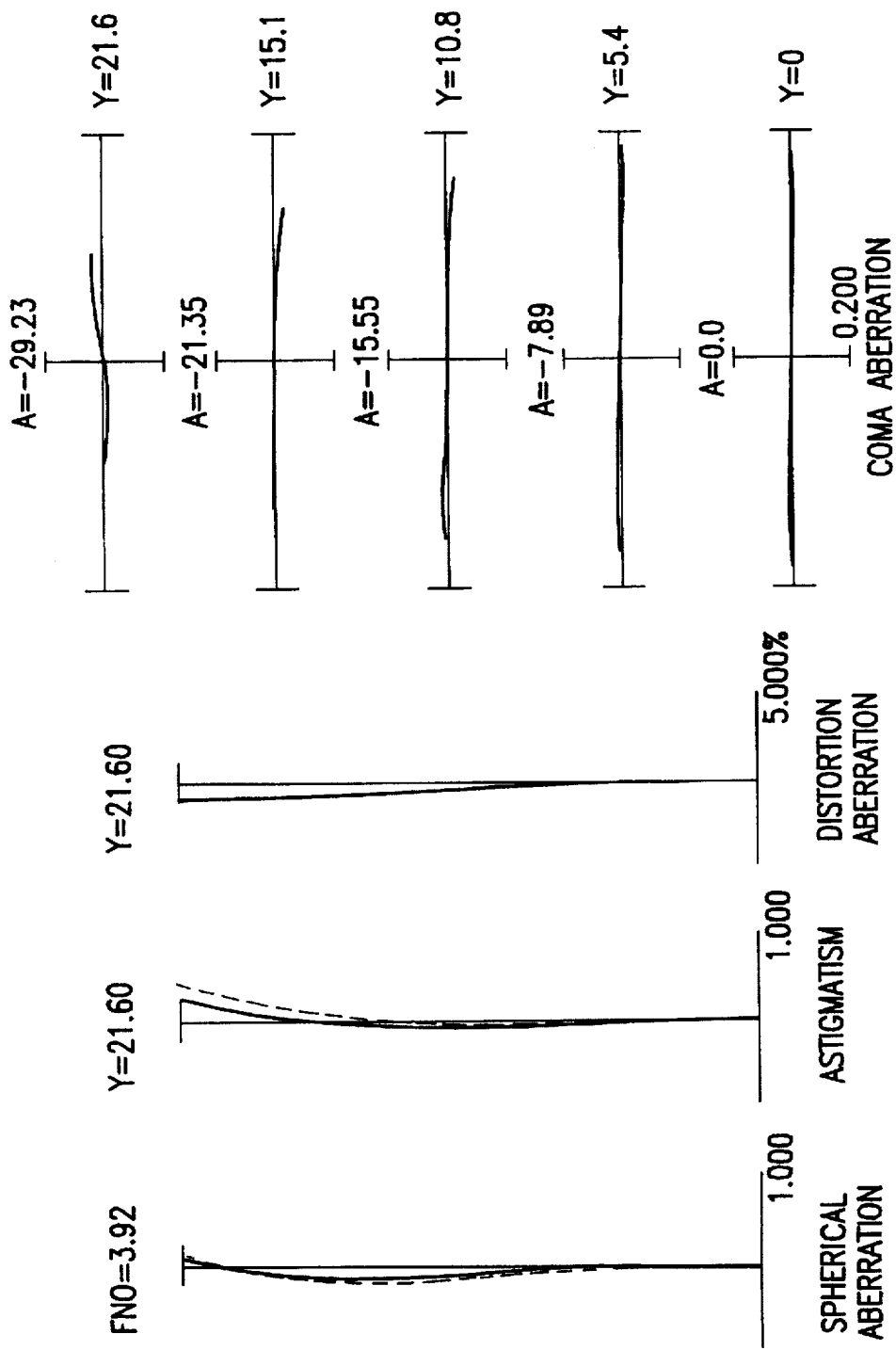
FIG. 7A is a diagram showing spherical aberration for the infinite focus state at the maximum wide-angle state in the first embodiment of the present invention.
FIG. 7B is a diagram showing astigmatism for the infinite focus state at the maximum wide-angle state in the first embodiment of the present invention.
FIG. 7C is a diagram showing distortion aberration for the infinite focus state at the maximum wide-angle state in the first embodiment of the present invention.
FIG. 7D is a diagram showing coma aberration for the infinite focus state at the maximum wide-angle state in the first embodiment of the present invention.
Figure 8:
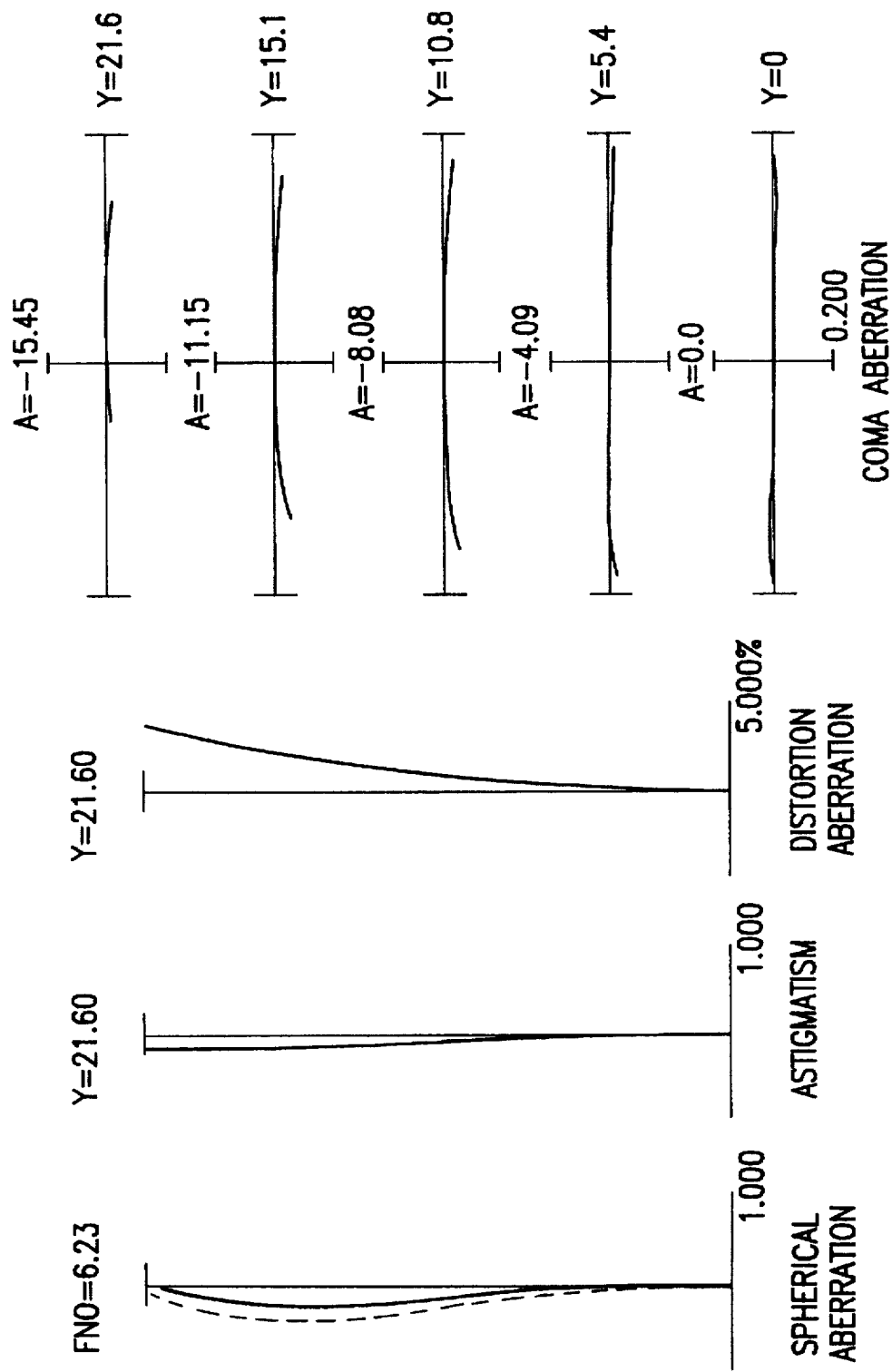
FIG. 8A is a diagram showing spherical aberration for the infinite focus state at the medium focal length state in the first embodiment of the present invention.
FIG. 8B is a diagram showing astigmatism for the infinite focus state at the medium focal length state in the first embodiment of the present invention.
FIG. 8C is a diagram showing distortion aberration for the infinite focus state at the medium focal length state in the first embodiment of the present invention.
FIG. 8D is a diagram showing coma aberration for the infinite focus state at the medium focal length state in the first embodiment of the present invention.
Figure 9:
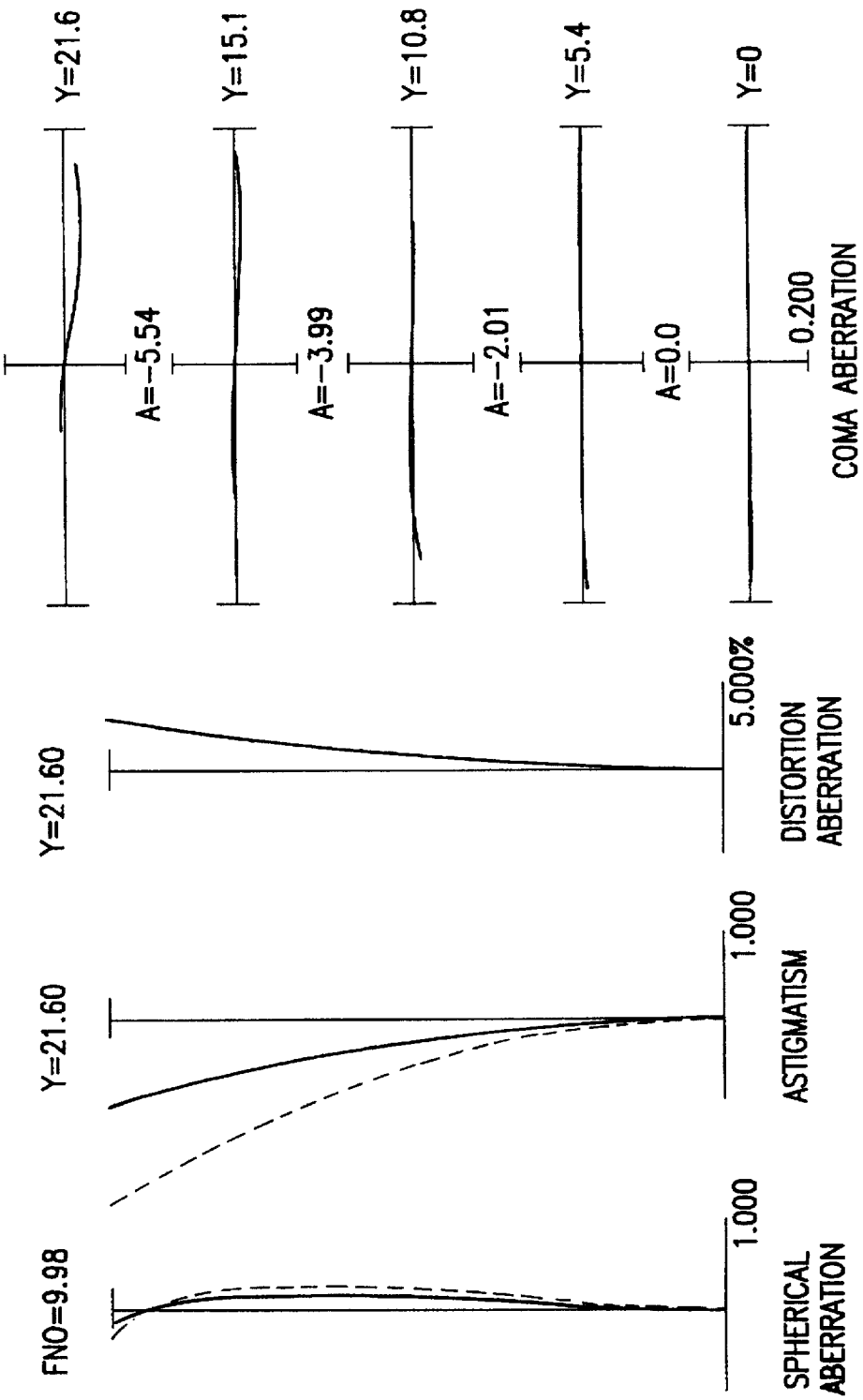
FIG. 9A is a diagram showing spherical aberration for the infinite focus state at the maximum telephoto state in the first embodiment of the present invention.
FIG. 9B is a diagram showing astigmatism for the infinite focus state at the maximum telephoto state in the first embodiment of the present invention.
FIG. 9C is a diagram showing distortion aberration for the infinite focus state at the maximum telephoto state in the first embodiment of the present invention.
FIG. 9D is a diagram showing coma aberration for the infinite focus state at the maximum telephoto state in the first embodiment of the present invention.

FIG. 6 is a flow chart showing the order of operations in a first embodiment of the present invention.

When the release button 2 is half-depressed, the range finding system 3 measures distance, detects the object position, and outputs object position information. The correction amount necessary in order to correct parallax is calculated from a predetermined computation equation on the basis of the object position information, i.e., object distance information, thus obtained and the focal length information (not shown). Parallax is corrected by driving the positive cemented lens L42, i.e., the correcting lens group, vertically by the calculated correction amount.

When the release button 2 is depressed completely, the range finding system 3 measures distance, detects the object position and outputs object position information. The focussing displacement is calculated by a predetermined computation equation on the basis of the object position information, i.e., object distance information, thus obtained and the focal length information (not shown). The third lens group G3, i.e., the focussing lens group, is driven by the calculated focussing displacement, which accomplishes focussing.

The correction amount necessary to correct parallax is calculated by a predetermined computation equation on the basis of the object position information, i.e., object distance information thus obtained and the focal length information (not shown). Furthermore, parallax is corrected by driving the positive cemented lens L42, which is the correcting lens group, vertically by the calculated correction amount. Photography is thus accomplished in a focus state in which parallax has been corrected.

The values of various dimensions of the first embodiment of the present invention are listed in Table (1) below. In Table (1), f is focal length, FNO is F-number, ω is the field half-angle and Bf is back focus. The surface number indicates the order of the lens surfaces from the object side along the direction in which the light rays move. The refractive indices and Abbe numbers are the values corresponding to a d-line (λ=587.6 nm).

In the first embodiment, the minimum object distance is 1 m, and the distance D between the optical axis of the shooting lens system and the optical axis of the viewfinder system is 25 mm.

TABLE 1 f = 38.99 ~ 75.39 ~ 154.01
FNO = 3.91 ~ 6.23 ~ 10.00
ω = 29.23 ~ 15.45 ~ 7.79°

| Surface Number | Radius of Curvature | Intersurface Distance | Refractive Index | Abbe Number |
|---|---|---|---|---|
| 1 | 73.7417 | 4.039 | 1.48749 | 70.45 |
| 2 | −41.5811 | 1.388 | 1.86074 | 23.01 |
| 3 | −63.8257 | (D3 = variable) | | |
| 4 | −41.0313 | 1.136 | 1.79961 | 45.37 |
| 5 | 21.9975 | 0.884 | | |
| 6 | 18.8960 | 3.155 | 1.78472 | 25.80 |
| 7 | −125.8654 | 1.010 | | |
| 8 | −21.0597 | 1.136 | 1.79961 | 45.37 |
| 9 | −222.7733 | (D9 = variable) | | |
| 10 | 440.0524 | 2.146 | 1.51680 | 64.10 |
| 11 | −20.2051 | (D11 = variable) | | |
| 12 | ∞ | 2.272 | (aperture diaphragm S) | |
| 13* | −44.7010 | 1.262 | 1.58518 | 30.24 |
| 14 | −65.6383 | 0.379 | | |
| 15 | 27.9565 | 3.408 | 1.48749 | 70.45 |
| 16 | −15.0304 | 1.261 | 1.86074 | 23.01 |
| 17 | −24.8801 | 2.019 | | |
| 18 | −26.1571 | 1.641 | 1.49108 | 57.57 |
| 19 | −21.9891 | (D19 = variable) | | |
| 20 | −63.2306 | 3.156 | 1.80458 | 25.50 |
| 21 | −22.5326 | 0.252 | | |
| 22 | −53.6801 | 1.262 | 1.79961 | 45.37 |
| 23 | −215.3584 | 4.291 | | |
| 24 | −15.1445 | 1.515 | 1.77279 | 49.45 |
| 25 | −832.1512 | (Bf) | | |

(aspherical surface data)
Surface 13

| | | |
|---|---|---|
| R | = | −44.7010 |
| κ | = | 1.0000 |
| $C_4$ | = | $-2.11756 \times 10^{-5}$ |
| $C_6$ | = | $-5.38090 \times 10^{-8}$ |
| $C_8$ | = | $-1.35276 \times 10^{-9}$ |
| $C_{10}$ | = | $9.45620 \times 10^{-12}$ |

(variable space for zooming)

| f | 38.9904 | 75.3947 | 154.0058 |
|---|---|---|---|
| D3 | 2.1456 | 12.6142 | 25.1214 |
| D9 | 4.4282 | 2.4447 | 1.2621 |
| D11 | 3.1446 | 5.1281 | 6.3107 |
| D19 | 16.8858 | 8.9850 | 1.8869 |
| Bf | 9.1062 | 30.8789 | 70.4949 |

(focussing displacement and parallax correction amount at object distance 2 m)

| focal length f | 36.9904 | 75.3947 | 154.0058 |
|---|---|---|---|
| photographic magnification | −0.0197 | −0.0381 | −0.0772 |
| distance to object | 1926.6785 | 1902.3377 | 1857.3124 |
| correction amount | 0.3967 | 0.4807 | 0.6088 |
| displacement | 0.6194 | 0.8987 | 1.6015 |

Here, movement toward the image side is taken to be positive displacement.

(focussing displacement and parallax correction amount at object distance 1 m)

| focal length f | 38.9904 | 75.3947 | 154.0058 |
|---|---|---|---|
| photographic magnification | −0.0399 | −0.0770 | −0.1546 |

-continued

| (focussing displacement and parallax correction amount at object distance 1 m) | | | |
|---|---|---|---|
| distance to object | 926.6785 | 902.3377 | 857.3124 |
| correction amount | 0.8035 | 0.9711 | 1.2193 |
| displacement | 1.2579 | 1.8207 | 3.2329 |

Here, movement toward the image side is taken to be positive displacement. (values corresponding to conditions)

Bt=3.168

Bw=1.244

(1) (Bt/Bw)/Z=0.645

FIGS. 7A–FIG. 9D show various aberration diagrams for d-line ($\lambda$=587.6 nm) of the first embodiment of the present invention. FIGS. 7A–9D show various aberration diagrams for the infinite focus state at the maximum wide-angle state, i.e., shortest focal length state. FIGS. 8A–8D show various aberration diagrams for the infinite focus state at the medium focal length state. FIGS. 9A–9D show various aberration diagrams for the infinite focus state at the maximum telephoto state, i.e., longest focal length state.

In each aberration diagram, FNO is F-number, Y is image height and A is the field half-angle with respect to each image height.

In the aberration diagrams showing astigmatism, is the solid line represents the sagittal image plane, while the broken line represents the meridional image plane. In the aberration diagrams showing spherical surface aberration, the broken line represents the sine condition.

As is clear from each of the diagrams, various aberrations are corrected effectively by use of the present embodiment of the invention.

Figure 10:
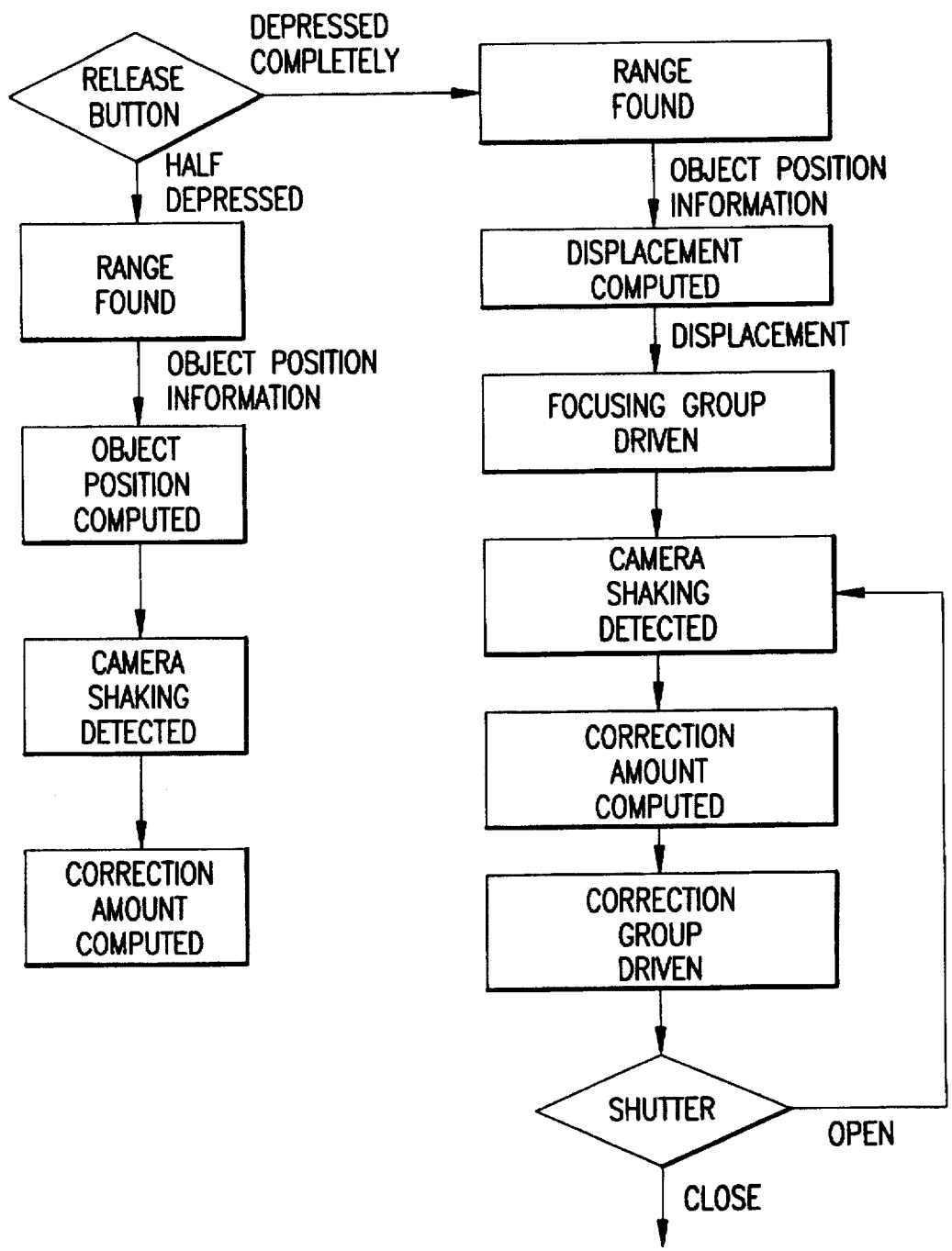
FIG. 10 is a flow chart showing the order of operations in a second embodiment of the present invention.

FIG. 10 is a flowchart showing the order of operations of a second embodiment of the present invention.

When the release button 2 is half-depressed, the range finding system 3 measures distance, detects the object position, and outputs object position information. The actual object position is calculated on the basis of the object position.

The defocus of the shooting lens system is detected by an angular speed sensor. The composite correction amount that includes the image position fluctuation correction amount and the parallax correction amount is calculated via a predetermined equation on the basis of the detected defocus amount, the object position information, i.e., object distance information and the focal length information, i.e., the displacement $\Delta$ of the first lens group G1.

When the release button 2 is depressed completely, the range finding system 3 measures distance, detects the object position and outputs object position information. The focussing displacement is calculated via a predetermined equation on the basis of the object position information, i.e., object distance information, thus obtained and the focal length information (not shown). The third lens group G3, i.e., the focussing lens group, is driven by the calculated focussing displacement, which accomplishes focussing.

The defocus of the shooting lens system is detected by the angular speed sensor. The composite correction amount that includes the image position fluctuation correction amount and the parallax correction amount is calculated via a predetermined equation on the basis of the detected defocus amount, the object position information and the focal length information $\Delta$. The positive cemented lens L42, i.e., the correcting lens group, is driven by the calculated composite correction amount in the vertical direction. Parallax and fluctuations in the image position caused by camera shaking are also corrected. When the shaking of the camera causes excessively large fluctuations in the image position, the shutter defocus of the shooting lens system is again detected without the shutter closing.

The values of various dimensions of the second embodiment of the present invention are listed in Table (2) below. In Table (2), f is focal length, FNO is F-number, $\omega$ is the field half-angle and Bf is back focus. The surface number indicates the order of the lens surfaces from the object side along the direction of travel of the light rays. The refractive indices and Abbe numbers are the values corresponding to a d-line ($\lambda$=587.6 nm).

In the second embodiment, the minimum object distance in 1 mm, and the deviation amount D between the optical axis of the shooting lens system and the optical axis of the viewfinder system is 28 mm.

TABLE 2 f = 39.00 ~ 75.72 ~ 126.21 ~ 184.70
FNO = 4.00 ~ 6.30 ~ 8.71 ~ 11.00
$\omega$ = 29.37 ~ 15.42 ~ 9.45 ~ 6.53°

| Surface Number | Radius of Curvature | Intersurface Distance | Refractive Index | Abbe Number |
|---|---|---|---|---|
| 1 | 65.2395 | 4.039 | 1.48749 | 70.41 |
| 2 | –43.6661 | 1.389 | 1.84666 | 23.83 |
| 3 | –71.1881 | (D3 = variable) | | |
| 4 | –39.3377 | 1.010 | 1.83500 | 42.97 |
| 5 | 21.9280 | 0.884 | | |
| 6 | 18.9681 | 3.029 | 1.78472 | 25.70 |
| 7 | –59.8735 | 0.757 | | |
| 8 | –21.9898 | 1.010 | 1.83500 | 42.97 |
| 9 | 2328.2941 | (D9 = variable) | | |
| 10 | 351.9850 | 2.146 | 1.51680 | 64.20 |
| 11 | –20.2634 | (D11 = variable) | | |
| 12 | ∞ | 2.272 | (aperture diaphragm S) | |
| 13* | –40.8344 | 1.262 | 1.58518 | 30.24 |
| 14 | –63.1068 | 0.884 | | |
| 15 | 29.7540 | 3.155 | 1.48749 | 70.41 |
| 16 | –15.2696 | 1.010 | 1.84666 | 23.83 |
| 17 | –25.6097 | 1.767 | | |
| 18 | –34.1715 | 1.641 | 1.49108 | 57.57 |
| 19 | –25.8162 | (D19 = variable) | | |
| 20 | –91.9033 | 3.282 | 1.84666 | 23.83 |
| 21 | –25.0732 | 0.757 | | |
| 22 | –47.1652 | 1.262 | 1.83500 | 42.97 |
| 23 | 1154.6027 | 4.922 | | |
| 24 | –15.2572 | 1.515 | 1.83500 | 42.97 |
| 25 | –104.7092 | | (Bf) | |

| (aspherical surface data) Surface 13 | | |
|---|---|---|
| R | = | –40.8344 |
| $\kappa$ | = | 0.0032 |
| $C_4$ | = | –2.09374 × $10^{-5}$ |
| $C_6$ | = | –5.62266 × $10^{-8}$ |
| $C_8$ | = | –3.18563 × $10^{-9}$ |
| $C_{10}$ | = | –7.24641 × $10^{-12}$ |

| (variable space for zooming) | | | | |
|---|---|---|---|---|
| f | 38.9990 | 75.7249 | 126.2058 | 184.7072 |
| D3 | 2.1456 | 13.9265 | 23.6373 | 30.4002 |
| D9 | 5.1283 | 3.3381 | 2.4329 | 1.8932 |
| D11 | 2.4445 | 4.2347 | 5.1399 | 5.6796 |
| D19 | 18.2183 | 10.5213 | 5.4203 | 1.8932 |
| Bf | 7.9381 | 27.8415 | 50.9669 | 74.9010 |

| (focussing displacement and parallax correction amount at object distance 2 m) | | | | |
|---|---|---|---|---|
| focal length f | 38.9990 | 75.7249 | 126.2058 | 184.7072 |

TABLE 2-continued

| | f = 39.00 ~ 75.72 ~ 126.21 ~ 184.70 FNO = 4.00 ~ 6.30 ~ 8.71 ~ 11.00 ω = 29.37 ~ 15.42 ~ 9.45 ~ 6.53° | | | |
|---|---|---|---|---|
| photographic magnification | −0.0198 | −0.0382 | −0.0631 | −0.0912 |
| distance to object | 1926.1357 | 1902.1478 | 1874.4123 | 1847.2433 |
| correction amount | 0.4546 | 0.5591 | 0.6694 | 0.7679 |
| displacement | 0.5854 | 0.8918 | 1.3821 | 2.0263 |

Here, movement toward the image side is taken to be positive displacement.

| (focussing displacement and parallax correction amount at object distance 1 m) | | | | |
|---|---|---|---|---|
| focal length f | 38.9990 | 75.7249 | 126.2058 | 184.7072 |
| photographic magnification | −0.0401 | −0.0771 | −0.1262 | −0.1801 |
| distance to object | 926.1357 | 902.1478 | 874.4123 | 847.2433 |
| correction amount | 0.9215 | 1.1278 | 1.3380 | 1.5154 |
| displacement | 1.1891 | 1.8048 | 2.7808 | 4.0507 |

Here, movement toward the image side is taken to be positive displacement. (values corresponding to conditions)

Bt=3.328

Bw=1.218

(1) (Bt/Bw)/Z=0.577

In the second embodiment, the parallax correction amount δs is calculated by the approximation equation (C) below, where Δ is the displacement taking the maximum wide-angle state of the first lens group G1 as a standard and R is the object distance.

$$\delta s\ (mm) = (0.8988 \times 10^{-2} R^{-1} + 0.7244 \times 10^{-6} R^{-2}) \Delta - (0.8034 \times 10^{-4} R^{-1} + 0.1140 \times 10^{-3} R^{-2}) \Delta^2 \quad (C)$$

The image position fluctuation correction amount δa is calculated by approximation equation (D) below on the basis of the defocus amount which was detected by the camera shake detecting system.

$$\delta a\ (mm/0.01\ rad) = 0.31996 \times 10^{-2} \Delta - 0.27869 \times 10^{-5} \Delta^2 \quad (D)$$

The composite correction amount is calculated by adding the parallax correction amount δs to the image position fluctuation amount δa. The parallax correction amount δs is a vector quantity along a predetermined direction unique to the camera. The image position fluctuation correction amount δa is a vector quantity along an arbitrary direction.

FIGS. 11–FIG. 13 show various aberration diagrams for d-line (λ=587.6 nm) in the first embodiment of the present invention. FIGS. 11A–11D show various aberration diagrams for the infinite focus state at the maximum wide-angle state. FIGS. 12A–12D show various aberration diagrams for the infinite focus state at the medium focal length state. FIGS. 13A–13D show various aberration diagrams for the infinite focus state at the maximum telephoto state.

In each of the aberration diagrams, FNO is F-number, Y is image height and A is the field half-angle with respect to each image height.

In the aberration diagrams showing astigmatism, the solid line represents the sagittal image plane, while the broken line represents the meridional image plane. In the aberration diagrams showing spherical surface aberration, the broken line represents the sine condition.

As is clear from each of the diagrams, various aberrations can be corrected effectively by using this embodiment of the present invention.

As described above, this invention corrects parallax of a camera through image shifting.

In addition, as shown in the second embodiment, it is also possible to correct both parallax and fluctuations in the image position that are caused by camera shaking or the like by applying the present invention to the shake preventing optical system.

The shooting lens system of the present embodiments has good image performance even when functioning as a normal shooting lens system.

The arrangement and combination of the viewfinder system and the shooting lens system are not limited to the above-described embodiments.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A camera for photographing an object and having an apparatus for correcting parallax, comprising:

a viewfinder optical system for viewing the object and having an optical axis;

a shooting lens system for photographing the object and having an optical axis, disposed such that the optical axis of the shooting lens system is different from the optical axis of the viewfinder optical system, the shooting lens system including a correcting lens group such that image shift is accomplished by decentering the correcting lens group; and a focussing lens group moveable along the optical axis of the shooting lens system during focussing and spaced from the correcting lens group;

wherein parallax created by changes in the position of the object is corrected by accomplishing an image shift by the shooting lens system, and the shooting lens system satisfies the equation:

0.2<(Bt/Bw)/Z<1, wherein βat is a lateral magnification at a maximum telephoto state of the correcting lens group, βbt is a lateral magnification at a maximum telephoto state of a lens group that is positioned to an image side of the correcting lens group, βaw is a lateral magnification at a maximum wide-angle state of the correcting lens group, βbw is a lateral magnification at a maximum wide-angle state of the lens group positioned to the image side of the correcting lens group, fw is a focal length of the shooting lens system at the maximum wide-angle state, ft is a focal length of the shooting lens system at the maximum telephoto state, Bt is a quantity expressed by (1—βat) βbt, Bw is a quantity expressed by (1—βaw) βbw, and Z is a zooming ratio expressed by ft/fw.

2. The camera according to claim 1, wherein the camera has an object side and the focussing lens group is disposed closer to the object side of the camera than the correcting lens group.

3. The camera according to claim 2, further comprising a detector for detecting object position and a driver for decentering the correcting lens group, wherein the driver corrects parallax by driving the correcting lens group by a correction amount based upon object position detected by the detector.

4. The camera according to claim 3, wherein the driver drives the correcting lens group in a direction perpendicular to the optical axis of the shooting lens system.

5. The camera according to claim 4, wherein the shooting lens system is a variable focal length lens system, and the correction amount is calculated on the basis of object position and a focal length of the shooting lens system.

6. A camera for photographing an object and having an apparatus for correcting parallax, comprising:

a viewfinder optical system for viewing the object and having an optical axis; and a shooting lens system for photographing the object and having an optical axis, disposed such that the optical axis of the shooting lens system is different from the optical axis of the viewfinder optical system, the shooting lens system including a correcting lens group, wherein the correcting lens group is driven in a direction perpendicular to the optical axis of the shooting lens system to correct parallax that is created by changes in object position and to satisfy the equation:

$0.2 < (Bt/Bw)/Z < 1$, wherein $\beta at$ is a lateral magnification at a maximum telephoto state of the correcting lens group, $\beta bt$ is a lateral magnification at a maximum telephoto state of a lens group that is positioned to an image side of the correcting lens group, $\beta aw$ is a lateral magnification at a maximum wide-angle state of the correcting lens group, $\beta bw$ is a lateral magnification at a maximum wide-angle state of the lens group positioned to the image side of the correcting lens group, fw is a focal length of the shooting lens system at the maximum wide-angle state, ft is a focal length of the shooting lens system at the maximum telephoto state, Bt is a quantity expressed by $(1-\beta at) \beta bt$, Bw is a quantity expressed by $(1-\beta aw) \beta bw$, and Z is a zooming ratio expressed by ft/fw.

7. A camera for photographing an object and having an apparatus for correcting parallax, comprising:

means for viewing the object having an optical axis;

means for photographing the object having an optical axis, disposed such that the optical axis of the means for photographing is different from the optical axis of the means for viewing, the means for photographing including a correcting lens group such that image shift is accomplished by decentering the correcting lens group; and means for focusing moveable along the optical axis of the means for photographing during focusing and spaced from the correcting lens group;

wherein parallax created by changes in the position of the object is corrected by accomplishing an image shift by the means for photographing, and the means for photographing satisfies the equation:

$0.2 < (Bt/Bw)/Z < 1$, wherein pat is a lateral magnification at a maximum telephoto state of the correcting lens group, $\beta bt$ is a lateral magnification at a maximum telephoto state of a lens group that is positioned to an image side of the correcting lens group, $\beta aw$ is a lateral magnification at a maximum wide-angle state of the correcting lens group, $\beta bw$ is a lateral magnification at a maximum wide-angle state of the lens group positioned to the image side of the correcting lens group, fw is a focal length of the shooting lens system at the maximum wide-angle state, ft is a focal length of the shooting lens system at the maximum telephoto state, Bt is a quantity expressed by $(1-\beta at) \beta bt$, Bw is a quantity expressed by $(1-\beta aw) \beta bw$, and Z is a zooming ratio expressed by ft/fw.

8. The camera according to claim 7, wherein the camera has an object side and the means for focusing is disposed closer to the object side than to the correcting lens group.

9. The camera according to claim 8, further comprising means for detecting object position and means for decentering the correcting lens group, wherein the means for decentering corrects parallax by driving the correcting lens group by a correction amount based upon object position detected by the means for detecting.

10. The camera according to claim 9, wherein the means for decentering drives the correcting lens group in a direction perpendicular to the optical axis of the means for photographing.

11. The camera according to claim 10, wherein the means for photographing is a variable focal length lens system, and the correction amount is calculated on the basis of object position and a focal length of the means for photographing.

12. A camera for photographing an object and having an apparatus for correcting parallax, comprising:

means for viewing the object having an optical axis; and means for photographing the object having an optical axis, disposed such that the optical axis of the means for photographing is different from the optical axis of the means for viewing, the means for photographing including a correcting lens group, wherein the correcting lens group is driven in a direction perpendicular to the optical axis of the means for photographing to correct parallax that is created by changes in the object position and to satisfy the equation:

$0.2 < (Bt/Bw)/Z < 1$, wherein $\beta at$ is a lateral magnification at a maximum telephoto state of the correcting lens group, $\beta bt$ is a lateral magnification at a maximum telephoto state of a lens group that is positioned to an image side of the correcting lens group, $\beta aw$ is a lateral magnification at a maximum wide-angle state of the correcting lens group, $\beta bw$ is a lateral magnification at a maximum wide-angle state of the lens group positioned to the image side of the correcting lens group, fw is a focal length of the shooting lens system at the maximum wide-angle state, ft is a focal length of the shooting lens system at the maximum telephoto state, Bt is a quantity expressed by $(1-\beta at) \beta bt$, Bw is a quantity expressed by $(1-\beta aw) \beta bw$, and Z is a zooming ratio expressed by ft/fw.

\* \* \* \* \*